(No Model.)
T. A. & W. T. JEBB.
METHOD OF AND APPARATUS FOR MANUFACTURING DISTILLED SPIRITS FROM GRAIN.
No. 254,329. Patented Feb. 28, 1882.
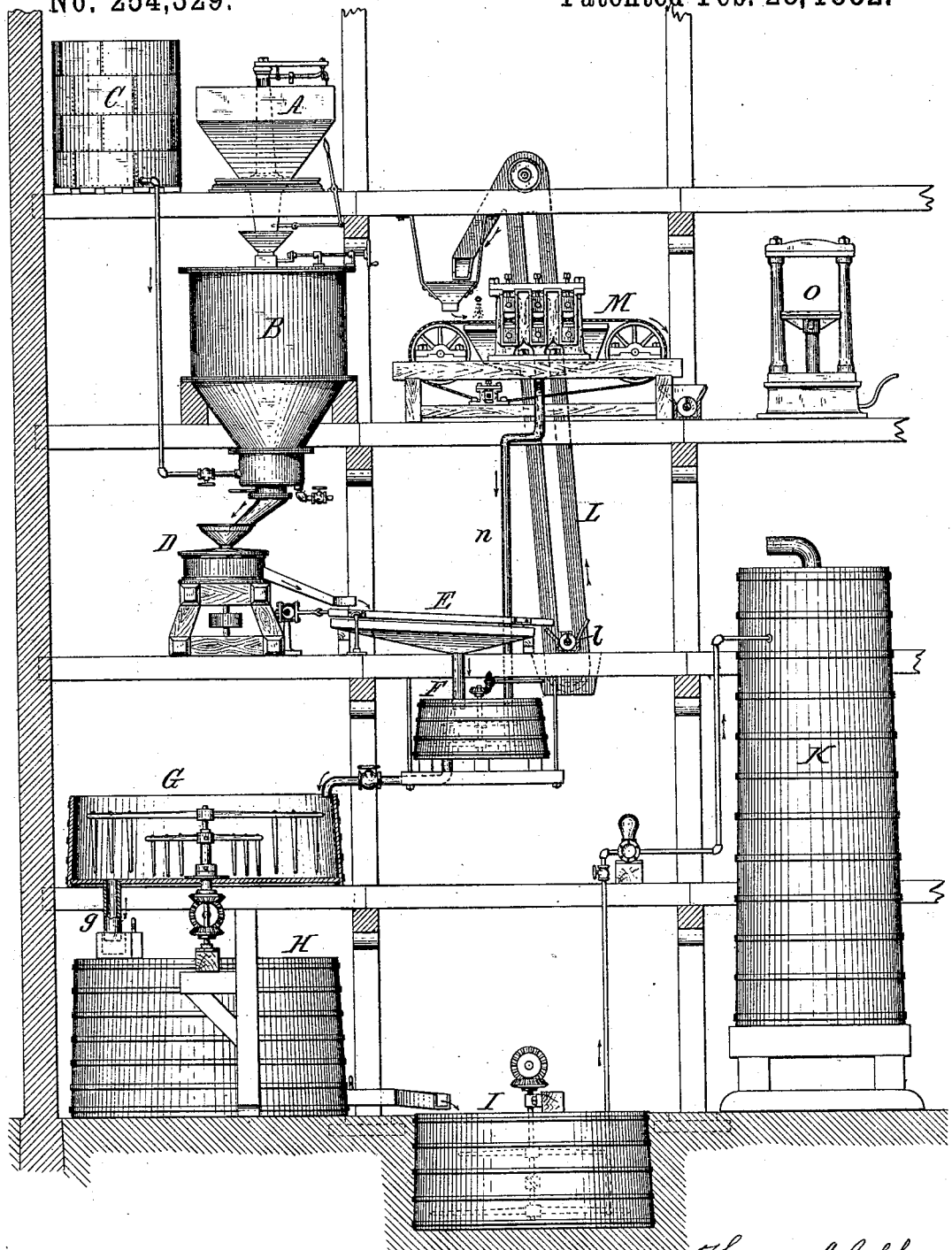

UNITED STATES PATENT OFFICE.

THOMAS A. JEBB AND WILLIAM T. JEBB, OF BUFFALO, NEW YORK.

METHOD OF AND APPARATUS FOR MANUFACTURING DISTILLED SPIRITS FROM GRAIN.

SPECIFICATION forming part of Letters Patent No. 254,329, dated February 28, 1882.

Application filed January 24, 1882. (No model.)

*To all whom it may concern:*

Be it known that we, THOMAS A. JEBB and WILLIAM T. JEBB, of the city of Buffalo, in the county of Erie and State of New York, have invented new and useful Improvements in Methods of and Apparatus for Manufacturing Distilled Spirits from Grain, of which the following is a specification.

This invention relates to an improvement in the art of producing distilled spirits from grain, and more especially to a method of treating the grain in which the bran is first separated from the starchy portions of the grain and the latter are mashed, fermented, and distilled alone, whereby the contamination of the spirits with fusel-oil and other deleterious substances contained in or derived from the outer portions of the grain is to a large extent avoided and the offal or feed preserved in a more useful condition, as more fully described in Letters Patent of the United States No. 243,910, granted to us July 5, 1881.

The object of the present invention is to simplify this method of manufacturing distilled spirits from grain and the plant of machinery necessary for carrying said methods into effect.

Our invention consists of the particular method of treating the grain for the manufacture of distilled spirits, and of the combination of machines or apparatus employed in carrying out said method, which will be hereinafter fully described.

The accompanying drawing represents a sectional elevation of the apparatus employed in manufacturing spirits according to our improved method.

A represents the weigh-hopper in which the grain to be worked up is weighed, and from which it passes to a steep-tub, B, arranged below the weigh-hopper. The steep-tub B is preferably constructed of iron in the manner described and shown in Letters Patent of the United States No. 240,907, granted to us May 3, 1881. The grain is steeped in this tub for a sufficient length of time to thoroughly soften the grain, but without causing fermentation to set in. The steep-water is preferably maintained at a temperature of from 120° to 130° Fahrenheit.

C is a hot-water tub or tank, from which water is supplied to the steep-tub B.

D represents a grinding-mill of any suitable and well-known construction, which receives the grain from the steep B, and whereby the grain is reduced to such a degree of fineness that the bran or outer covering of the kernels of grain can be separated from the inner or starchy portions by sifting.

E represents a shaking or other suitable sieve, upon which the ground grain is delivered from the mill, and whereby the bran is separated from the starchy portions of the grain, the latter passing through the meshes of the screen, while the bran escapes over the tail thereof. This separation is facilitated and expedited by fine streams of water, which are delivered upon the separating-surface from perforated pipes in a well-known manner.

F represents a receiver, in which the starch-water is collected from one or more separating-machines, E, and which is preferably provided with a revolving stirrer or other suitable agitator, whereby the starch is kept in suspension.

G represents a mash-tub of any suitable or well-known construction, which receives the starch-water from the receiver F, and in which said starch-water is mashed and mixed with a suitable quantity of small grains or crushed malt. When the operation of mashing is completed the mash is conducted by pipes or troughs *g* into suitable fermenting tubs or vats, H, in which yeast is added to the mash if it has not been introduced into the mash in the mash-tub. The fermentation is conducted in these fermenting-tubs in the usual manner, and when completed the beer is collected in the beer-receiver I, from which it is charged into the still K in a well-known manner. The spirits are now distilled off in the usual way. The bran and other coarse offal which is discharged from the separating-machine E is conducted by a conveyer, *l*, and elevator L, or other suitable means, to a squeezing-machine, M, of well-known construction, in which the wet offal is passed by an endless apron of wire-cloth between one or more pairs of rollers, whereby the moisture is pressed out of the offal and the latter discharged in a comparatively dry state, while the starchy liquid pressed out of the offal is collected and conducted by a pipe, *n*, to the receiver F or the mash-tub G, where it commingles with the starch-water coming from the separator E. The dry offal which is discharged from the squeezing-machine M may be compacted into cakes by a hydraulic or other suitable press, O. The bran and other coarse material derived from the outer portions of the kernels of grain are separated from the starch before the operation of mashing begins, and the starchy constituent parts of the grain are fermented and distilled alone, whereby the liberation of fusel-oil and other deleterious substances in the mashed, fermented, and distilled material is avoided and the offal preserved in a sweet condition, in which it can be advantageously employed as feed for cattle, &c., and be kept for a considerable period of time and be shipped over long distances without souring.

The apparatus employed in carrying out this process is very simple and such as can be readily placed in distilleries already existing without requiring any material changes in the existing plant of machinery. The number of machines employed in each step of the process is of course regulated by the capacity of the distillery and the capacity and number of the receivers and fermenting-tubs should be such as will enable the process to be carried on without interruption.

We claim as our invention—

1. As an improvement in the art of manufacturing distilled spirits from grain, the herein-described method, which consists in first moistening the grain, then reducing it, then separating the bran and other coarse offal from the starchy substance, then mashing the separated starch together with a suitable quantity of small grains or malt, and then fermenting the mash and distilling the fermented material, substantially as set forth.

2. In an apparatus for manufacturing distilled spirits from grain, the combination of a moistening or soaking device, a suitable grinding-mill, whereby the grain is reduced, a separator whereby the bran and other coarse offal are separated from the starchy substances, a receiver in which the starchy substances are collected, a mash-tub in which the starchy substances are mashed, and one or more fermenting-tubs in which the mash is fermented, substantially as set forth.

3. In an apparatus for manufacturing distilled spirits from grain, the combination of a suitable grinding-mill, whereby the grain is reduced, a separator whereby the bran and other coarse offal are separated from the starchy substances, a receiver in which the starchy substances are collected, a mash-tub in which the starchy substances are mashed, and one or more fermenting-tubs in which the mash is fermented, substantially as set forth.

THOS. A. JEBB.
WILLIAM T. JEBB.

Witnesses:
JOHN TULLY,
WEDE ANDRUS.